(12) United States Patent
Takagaki et al.

(10) Patent No.: US 8,788,626 B2
(45) Date of Patent: Jul. 22, 2014

(54) CONTENT REPRODUCTION SYSTEM, CONTENT REPRODUCTION METHOD, CONTENT REPRODUCTION DEVICE, AND SERVER

(75) Inventors: Keiichi Takagaki, Osaka (JP); Yasushi Miyake, Osaka (JP); Tsutomu Hayashi, Gifu (JP)

(73) Assignee: Panasonic Corporation, Osaka (JP)

( * ) Notice: Subject to any disclaimer, the term of this patent is extended or adjusted under 35 U.S.C. 154(b) by 187 days.

(21) Appl. No.: 13/000,112

(22) PCT Filed: Jul. 29, 2009

(86) PCT No.: PCT/JP2009/003570
§ 371 (c)(1),
(2), (4) Date: Dec. 20, 2010

(87) PCT Pub. No.: WO2010/013456
PCT Pub. Date: Feb. 4, 2010

(65) Prior Publication Data
US 2011/0113123 A1 May 12, 2011

(30) Foreign Application Priority Data
Jul. 30, 2008 (JP) .................................. 2008-196144

(51) Int. Cl.
*G06F 15/16* (2006.01)
*G06F 15/173* (2006.01)

(52) U.S. Cl.
USPC .......................................... 709/219; 709/238

(58) Field of Classification Search
USPC ..................... 709/203; 386/252; 725/59–87
See application file for complete search history.

(56) References Cited

U.S. PATENT DOCUMENTS

| 7,668,933 | B2 * | 2/2010 | Yoshida et al. | 709/217 |
| 7,809,706 | B2 * | 10/2010 | Fujiwara | 707/706 |
| 8,024,340 | B2 * | 9/2011 | Kageyama et al. | 707/736 |

(Continued)

FOREIGN PATENT DOCUMENTS

| JP | 2006-033067 | * | 2/2006 | .............. H04N 5/93 |
| JP | 2006-033067 A | | 2/2006 | |

(Continued)

OTHER PUBLICATIONS

Sollins, Karen, et al. (Dec. 1994). IETF RFC 1737: Functional Requirements for Uniform Resource Names. 7 pp. Retrieved from http://www.ietf.org/rfc/rfc1737.txt.*

(Continued)

*Primary Examiner* — Lynn Feild
*Assistant Examiner* — Timothy Sowa
(74) *Attorney, Agent, or Firm* — McDermott Will & Emery LLP

(57) ABSTRACT

The content reproduction device receives, from a server, information for indicating the location of content reproduction control information that is required for acquiring the content reproduction control information, and acquires the content reproduction control information from the server. Then, the content reproduction device extracts AV data and clip identification information for specifying clip information for managing the AV data. Then, the content reproduction device converts a predetermined part of the information for indicating the location of the content reproduction control information by applying the clip identification information and a predetermined conversion rule, generates information for indicating the location of the clip information and the AV data, and acquires the clip information and the AV data from the server.

18 Claims, 14 Drawing Sheets

(56) References Cited

U.S. PATENT DOCUMENTS

| | | | |
|---|---|---|---|
| 2004/0073934 A1* | 4/2004 | Deshpande et al. | 725/87 |
| 2008/0002945 A1* | 1/2008 | Ushimaru et al. | 386/95 |
| 2008/0091687 A1 | 4/2008 | Watanabe et al. | |
| 2008/0133544 A1* | 6/2008 | Fujimoto | 707/10 |
| 2008/0151702 A1* | 6/2008 | Yuasa et al. | 369/24.01 |
| 2008/0162669 A1* | 7/2008 | Tonoike et al. | 709/219 |
| 2008/0183809 A1* | 7/2008 | Sato | 709/203 |
| 2008/0208952 A1* | 8/2008 | Yoshida et al. | 709/201 |
| 2008/0294693 A1* | 11/2008 | Hayashi | 707/104.1 |
| 2008/0301103 A1* | 12/2008 | Kusakabe et al. | 707/3 |
| 2009/0031368 A1* | 1/2009 | Ling | 725/87 |
| 2009/0157892 A1* | 6/2009 | Sekiguchi et al. | 709/231 |
| 2010/0235428 A1* | 9/2010 | Kikkawa | 709/203 |
| 2010/0284669 A1* | 11/2010 | Sasaki | 386/252 |

FOREIGN PATENT DOCUMENTS

| | | | | |
|---|---|---|---|---|
| JP | 2006-33067 A | | 2/2006 | |
| JP | 2007-306258 | * | 11/2007 | H04N 5/91 |
| JP | 2007-306258 A | | 11/2007 | |
| JP | 2008-041120 | * | 2/2008 | G11B 27/00 |
| JP | 2008-41120 A | | 2/2008 | |
| JP | 2008-041120 A | | 2/2008 | |
| WO | WO 2006/090612 A1 | | 8/2006 | |

OTHER PUBLICATIONS

Gettys, James (ed.), et al. (Jun. 1999). IETF RFC 2616: Hypertext Transfer Protocol—HTTP/1.1. 155 pp. Retrieved from http://www.ietf.org/rfc/rfc2616.txt.*

Microsoft. (2002). Microsoft Computer Dictionary. Redmond, WA: Microsoft Press.*

International Search Report for Application No. PCT/JP2009/003570, Sep. 15, 2009, Panasonic Corporation.

* cited by examiner

FIG. 6

| Structure of URL | | |
|---|---|---|
| | | URL |
| | Playlist | [http://[IP address of server + port number]xxxxxROOTDB_VPL?[ID of play list] |
| | Clipinfo | [http://[IP address of server + port number]xxxxx[clip number]_CLP?[ID of play list] |
| | AV data | [http://[IP address of server + port number]xxxxx[clip number]_TTS?[ID of play list] |

| Conversion rule of URL | | |
|---|---|---|
| | No | Conversion rule |
| | Playlist | |
| | Clipinfo | "ROOTDB_VPL" of URL of Playlist is converted into "[clip number]_CLP". |
| | AV data | "ROOTDB_VPL" of URL of Playlist is converted into "[clip number]_TTS". |

FIG. 7

Example of telegram for request of content list
(Example of request issued by general DLNA player)

POST/control/ContentDirectory HTTP/1.1
HOST:10.73.181.17:30000
USER-AGENT:DLNADOC/1.00
CONTENT-LENGTH:754
CONTENT-TYPE:text/xml;charset="utf-8"
SOAPACTION:"urn:schemas-upnp-org:service:ContentDirectory:1#Browse"
<s:Envelope xmlns:s="http://schemas.xmlsoap.org/soap/envelope/"
s:encodingStyle="http://schemas.xmlsoap.org/soap/encoding/">
  <s:Body>
    <u:Browse xmlns:u="urn:schemas-upnp-org:service:ContentDirectory:1">
      <ObjectID>338</ObjectID>
      <BrowseFlag>BrowseDirectChildren</BrowseFlag>
      <Filter>res,res@resolution,res@protocolInfo,res@size,res@duration,res@bitrate,res@sampleFrequency,res@bitsPerSample,res@nrAudioChannels,res@dlna:ifoFileURI,dc:creator,dc:date,upnp:genre,upnp:album,upnp:originalTrackNumber,upnp:channelNr,upnp:scheduledStartTime,upnp:scheduledEndTime,upnp:icon,upnp:albumArtURI,upnp:artist</Filter>
      <StartingIndex>0</StartingIndex>
      <RequestedCount>100</RequestedCount>
      <SortCriteria></SortCriteria>
    </u:Browse>
  </s:Body>
</s:Envelope>

FIG. 8

Example of telegram for response to content list (in the case where information of Playlist is incorporated into content list) (1/3)

```
HTTP/1.1 200 OK
CONTENT-TYPE:text/xml;charset="utf-8"
CONTENT-LENGTH:18344
<s:Envelope xmlns:s="http://schemas.xmlsoap.org/soap/envelope/"
s:encodingStyle="http://schemas.xmlsoap.org/soap/encoding/">
<s:Body>
<u:BrowseResponse xmlns:u="urn:schemas-upnp-org:service:ContentDirectory:1">
<Result>
<DIDL-Lite xmlns="urn:schemas-upnp-org:metadata-1-0/DIDL-Lite/"
xmlns:upnp="urn:schemas-upnp-org:metadata-1-0/upnp/"
xmlns:dc="http://purl.org/dc/elements/1.1/"
xmlns:dlna="urn:schemas-dlna-org:metadata-1-0/"
xmlns:my="http://my.com/my/">

<item id="339" parentID="338" restricted="1">
     <dc:title>B-MP2PS_N-1</dc:title>
     <res bitrate="682000" duration="0:00:59.559"
protocolInfo="http-
get:*:video/mpeg:DLNA.ORG_PN=MPEG_PS_NTSC;DLNA.ORG_OP=11;DLNA.ORG_CI=0;DLNA.ORG_FLAGS=0020000
00000000000000000000000"
resolution="720x480" nrAudioChannels="2" size"40644608"
my:PlayList=http://192.168.11.2:49251/AV/ROOTDB_RPL?CID=AV-0-01001-20080123123456>
http://192.168.11.2:49182/AV-01-01001-20080123123456_BDY
     </res>
     <upnp:class>object.item.videoItem</upnp:class>
     <upnp:album>MP2PS_N</upnp:album>
     <dc:date>2005-12-17T08:44:33</dc:date>
   </item>
```

Example of telegram for response to content list (in the case where information of Playlist is incorporated into content list) (2/3)
(Continued from FIG. 8)

```
<item id="447" parentID="338" restricted="1">
  <dc:title>B-MP2PS_N-8</dc:title>
  <res bitrate="195500" duration="0:27:26.144"
protocolInfo="http-get:*:video/mpeg:DLNA.ORG_PN=MPEG_PS_NTSC;DLNA.ORG_OP=11;DLNA.ORG_CI=0;DLNA.ORG_FLAGS=0020000
000000000000000000000000"
resolution="352x240" nrAudioChannels="1" size"3302237952"
my:PlayList=http://192.168.11.2:49251/AV/ROOTDB_RPL?CID=AV-0-01001-20080123123012>
http://192.168.11.2:49182/AV-01-01001-20080123123012_BDY
  </res>
  <upnp:class>object.item.videoItem</upnp:class>
  <upnp:album>MP2PS_N</upnp:album>
  <dc:date>2005-03-09T17:00:22</dc:date>
</item>
```

Example of telegram for response to content list (in the case where information of Playlist is incorporated into content list) (3/3)
(Continued from FIG. 9)

```
<item id="495" parentID="338" restricted="1">
  <dc:title>B-MP2PS_N-9</dc:title>
  <res bitrate="532000" duration="0:00:59.759"
    protocolInfo="http-
get:*:video/mpeg:DLNA.ORG_PN=MPEG_PS_NTSC;DLNA.ORG_OP=11;DLNA.ORG_CI=0;DLNA.ORG_FLAGS=0020000
000000000000000000000000"
    resolution="720x480" nrAudioChannels="2" size"33251328"
my:PlayList=http://192.168.11.2:49251/AV/ROOTDB_RPL?CID=AV-0-01001-20080123123789>
http://192.168.11.2:49182/AV-01-01001-20080123123789_BDY
  </res>
  <upnp:class>object.item.videoItem</upnp:class>
  <upnp:album>MP2PS_N</upnp:album>
  <dc:date>2005-03-09T16:53:06</dc:date>
</item>
</DIDL-Lite>
<NumberReturned>27</NumberReturned>
<TotalMatches>27</TotalMatches>
<UpdateID>28</UpdateID>
</u:BrowseResponse>
</s:Body>
</s:Envelope>
```

FIG. 11A

Example of telegram for request of Playlist file
GET/AV/ROOTDB_RPL?CID=AV-0-01001-20080123123456 HTTP/1.1
HOST:192.168.11.2:49251

FIG. 11B

Example of telegram for response to Playlist file
HTTP/1.1 200 OK
CONTENT-LENGTH:28344
(After that, contents of Playlist file continues as binary data)

FIG. 11C

Example of telegram for request of Clipinfo file
GET/AV/00004_CLP?CID=AV-0-01001-20080123123456 HTTP/1.1
HOST:192.168.11.2:49251

FIG. 11D

Example of telegram for response to Clipinfo file
HTTP/1.1 200 OK
CONTENT-LENGTH:18344
(After that, contents of Clipinfo file continues as binary data)

FIG. 11E

Example of telegram for request of AV data (range specification)
GET/AV/00004_TTS?CID=AV-0-01001-20080123123456 HTTP/1.1
HOST:192.168.11.2:49182
Range:bytes=12345-24690

FIG. 11F

Example of telegram for transmission of partial AV data
HTTP/1.1 206 Partial Content
Content-Range:bytes=12345-24690
(After that, data of 12345-th to 24690-th bytes of stream data 00004.m2ts comes as binary data)

CONTENT REPRODUCTION SYSTEM, CONTENT REPRODUCTION METHOD, CONTENT REPRODUCTION DEVICE, AND SERVER

This Application is a U.S. National Phase Application of PCT International Application PCT/JP2009/003570.

TECHNICAL FIELD

The present invention relates to a content reproduction system, a content reproduction method, a content reproduction device, and a server, and more specifically to a technology that is used for selecting and delivering a desired content to a reproduction device on a network and is appropriate for communicating various information related to the content.

BACKGROUND ART

An industry group DLNA (Digital Living Network Alliance) has promoted a standardizing action for interconnecting an electrical appliance and a personal computer that are manufactured by different manufacturers. A function including the following steps has been demanded:
  interconnecting, by a network, a digital media player conforming to a guideline defined by the DLNA and a digital media server device;
  acquiring a play list from the digital media server with the digital media player; and
  allowing remote viewing of a content.

However, devices of various capacities by various manufacturers are connected to the network conforming to a standard guideline such as the DLNA. Therefore, even when the digital media player acquires the play list together with the content from the digital media server, the digital media player does not necessarily have a capacity capable of interpreting the play list. As a technology of addressing such a problem, a technology is known where the digital media player accesses the digital media server that stores and accumulates the contents and the play list during remote viewing in the network conforming to a predetermined standard guideline (Patent Literature 1). Specifically, since the digital media player accesses a uniform resource locator (URL) of the content or a URL of the play list in the digital media server, normal reproduction or play list reproduction is allowed and play list reproduction in a removable medium having been recorded outside the network is allowed.

Regarding an information processor such as a video camera, a technology of generating a play list and clip information in a seamless reproducible form during recording of a content is known (Patent Literature 2). In other words, the content can be recorded in the seamless reproducible form, and a plurality of audio visual (AV) streams can be continuously reproduced using one play list.

In the system of Patent Literature 1, however, one AV stream data segment is required to correspond to one play list. Therefore, the system of Patent Literature 1 does not consider selection and reproduction of the content when a plurality of AV stream data segments correspond to one play list, namely when the plurality of AV stream data segments form the content. In other words, disadvantageously, a method is not considered in which integrated stream data is received from a digital media server that stores stream data (integrated stream data) consisting of a plurality of AV stream data segments (partial stream data segments), and is reproduced. The AV stream data segments are generated in an information processor of Patent Literature 2, for example.

In the system of Patent Literature 2, the AV stream data stored in the digital media server cannot be remotely viewed from the digital media player side.

In order to address the above-mentioned problems, a method is considered in which, when the integrated stream data is transmitted, a discontinuous point is previously specified using a discontinuity information table (DIT) on the digital media server side, and the discontinuous point is transmitted as one false stream data segment and is reproduced on the digital media player side. Additionally, a method is considered in which the integrated stream data is completely re-encoded to form one stream data segment, and the one stream data segment is reproduced on the digital media player side. However, the former method has a problem that DIT interpretation makes the seamless reproduction difficult, and the latter method has a problem that the load on the digital media server is large.

Citation List
  [Patent Literature]
  [Patent Literature 1] Unexamined Japanese Patent Publication No. 2008-41120 (first page, FIG. 1, and the like)
  [Patent Literature 2] Unexamined Japanese Patent Publication No. 2007-306258 (first page, FIG. 1, and the like)

SUMMARY OF THE INVENTION

A content reproduction system of the present invention has a server and a content reproduction device.

The server includes an AV data storage section, a clip information storage section, a content reproduction control information storage section, and a first transmitting/receiving section.

The AV data storage section stores a plurality of AV data segments. The clip information storage section stores clip information, which is management information of the AV data. The content reproduction control information storage section stores content reproduction control information for defining the reproduction order of the AV data segments in a content consisting of the AV data segments. The first transmitting/receiving section at least transmits the AV data, the clip information, the content reproduction control information, and first location information for indicating the location of the content reproduction control information.

The content reproduction device includes a second transmitting/receiving section, a content reproduction control information acquiring section, a content reproduction control information analyzing section, a clip information request generating section, a clip information acquiring section, an AV data request generating section, and an AV data acquiring section.

The second transmitting/receiving section at least receives, from the network, the AV data, the clip information, the content reproduction control information, and the first location information for indicating the location of the content reproduction control information. The content reproduction control information acquiring section acquires the content reproduction control information from the location indicated by the first location information. The content reproduction control information analyzing section extracts, from the content reproduction control information, one of the AV data segments and clip identification information that specifies clip information for managing the AV data segment. The clip information request generating section generates second location information for indicating the location of the clip information corresponding to the clip identification information based on a predetermined conversion rule and the first location information, and requests the server to acquire the clip information. The clip information acquiring section acquires the clip information corresponding to the clip identification information from the location indicated by the second location information. The AV data request generating section generates third location information for indicating the location of the AV data corresponding to the clip identification information based on a predetermined conversion rule and the first location information, and requests the server to acquire the AV data. The AV data acquiring section acquires the AV data corresponding to the clip identification information from the location indicated by the third location information.

Thus, any content consisting of one or more AV data segments can be selected and reproduced based on the play list.

Simple processing of converting a predetermined part of the information that indicates the location or the URL information allows content reproduction by the play list.

A server of the present invention includes an AV data storage section, a clip information storage section, a content reproduction control information storage section, and a first transmitting/receiving section.

The AV data storage section stores a plurality of AV data segments. The clip information storage section stores clip information, which is management information of the AV data. The content reproduction control information storage section stores content reproduction control information that defines the reproduction order of the AV data segments in a content consisting of the AV data segments. The first transmitting/receiving section at least transmits the AV data, the clip information, the content reproduction control information, and the first location information for indicating the location of the content reproduction control information.

A server of the present invention may further include a range information determining section. The AV data request generating section of the content reproduction device transmits, to the server, request range specification information for specifying a reproduction range of the AV data. The range information determining section compares the request range specification information with reproduction permitted range specification information for specifying a reproduction permitted range of the AV data. When the request range specification information exceeds the reproduction permitted range of the reproduction permitted range specification information, the transmitting/receiving section of the server transmits error information to the content reproduction device.

Thus, only the part of the AV data where reproduction is permitted by the server side can be reproduced by the content reproduction device, and a non-published part can be prevented from being reproduced.

The content reproduction device of the present invention includes a second transmitting/receiving section, a content reproduction control information acquiring section, a content reproduction control information analyzing section, a clip information request generating section, a clip information acquiring section, an AV data request generating section, and an AV data acquiring section.

The second transmitting/receiving section at least receives, from the network, the AV data, the clip information, the content reproduction control information, and the first location information for indicating the location of the content reproduction control information. The content reproduction control information acquiring section acquires the content reproduction control information from the location indicated by the first location information. The content reproduction control information analyzing section extracts, from the content reproduction control information, one of the AV data segments and clip identification information that specifies clip information for managing the AV data segment. The clip information request generating section generates second location information that indicates the location of the clip information corresponding to the clip identification information based on a predetermined conversion rule and the first location information, and requests the clip information from the location indicated by the second location information. The clip information acquiring section acquires the clip information from the location indicated by the second location information. The AV data request generating section generates third location information that indicates the location of the AV data corresponding to the clip identification information based on the predetermined conversion rule and the first location information, and requests the AV data from the location indicated by the third location information. The AV data acquiring section acquires the AV data from the location indicated by the third location information.

A content reproduction method of the present invention includes the following steps:
 a content reproduction control information acquiring processing step;
 a content reproduction control information analyzing processing step;
 a clip information request generating processing step;
 a clip information acquiring processing step;
 an AV data requesting processing step;
 an AV data acquiring processing step;
 a determining step of partial AV data reception completion; and
 a determining step of all partial AV data reception completion.

In the content reproduction control information acquiring processing step, content reproduction control information is acquired based on the first location information for indicating the location of the content reproduction control information that defines the reproduction order of a plurality of AV data segments in a content consisting of the AV data segments. In the content reproduction control information analyzing processing step, one of the AV data segments and the clip identification information for specifying the clip information for managing the AV data segment are extracted from the content reproduction control information. In the clip information request generating processing step, second location information for indicating the location of the clip information corresponding to the clip identification information is generated based on a predetermined conversion rule and the first location information, and the clip information is requested from the location indicated by the second location information. In the clip information acquiring processing step, the clip information is acquired from the location indicated by the second location information. In the AV data requesting processing step, third location information for indicating the location of the AV data corresponding to the clip identification information is generated based on the predetermined conversion rule and the first location information, and the AV data is requested from the location indicated by the third location information. In the AV data acquiring processing step, the AV data is acquired from the location indicated by the third location information. In the determining step of partial AV data reception completion, when telegrams of transmission of a plurality of partial AV data segments are repeatedly transmitted, it is determined whether the reception of the partial AV data is completed. In the determining step of all partial AV data reception completion, when a plurality of partial AV data segments is received, it is determined whether the reception of the all partial AV data is completed.

BRIEF DESCRIPTION OF DRAWINGS

FIG. 6 is a diagram illustrating a structure of the URL and a conversion rule in the content reproduction system in accordance with the first exemplary embodiment of the present invention.

FIG. 7 is a diagram showing one example of telegrams of the content reproduction system in accordance with the first exemplary embodiment of the present invention.

FIG. 8 is a diagram showing one example of the telegrams.

FIG. 9 is a diagram showing another example of the telegrams.

FIG. 10 is a diagram showing yet another example of the telegrams.

FIG. 11A is a diagram showing still another example of the telegrams.

FIG. 11B is a diagram showing still another example of the telegrams.

FIG. 11C is a diagram showing still another example of the telegrams.

FIG. 11D is a diagram showing still another example of the telegrams.

FIG. 11E is a diagram showing still another example of the telegrams.

FIG. 11F is a diagram showing still another example of the telegrams.

DETAILED DESCRIPTION OF PREFERRED EMBODIMENTS

A content reproduction system and a content reproduction method in accordance with exemplary embodiments of the present invention are described with reference to the accompanying drawings. When elements denoted with the same reference mark perform the same operation in exemplary embodiments, the same descriptions can be omitted.

First Exemplary Embodiment

Figure 1:
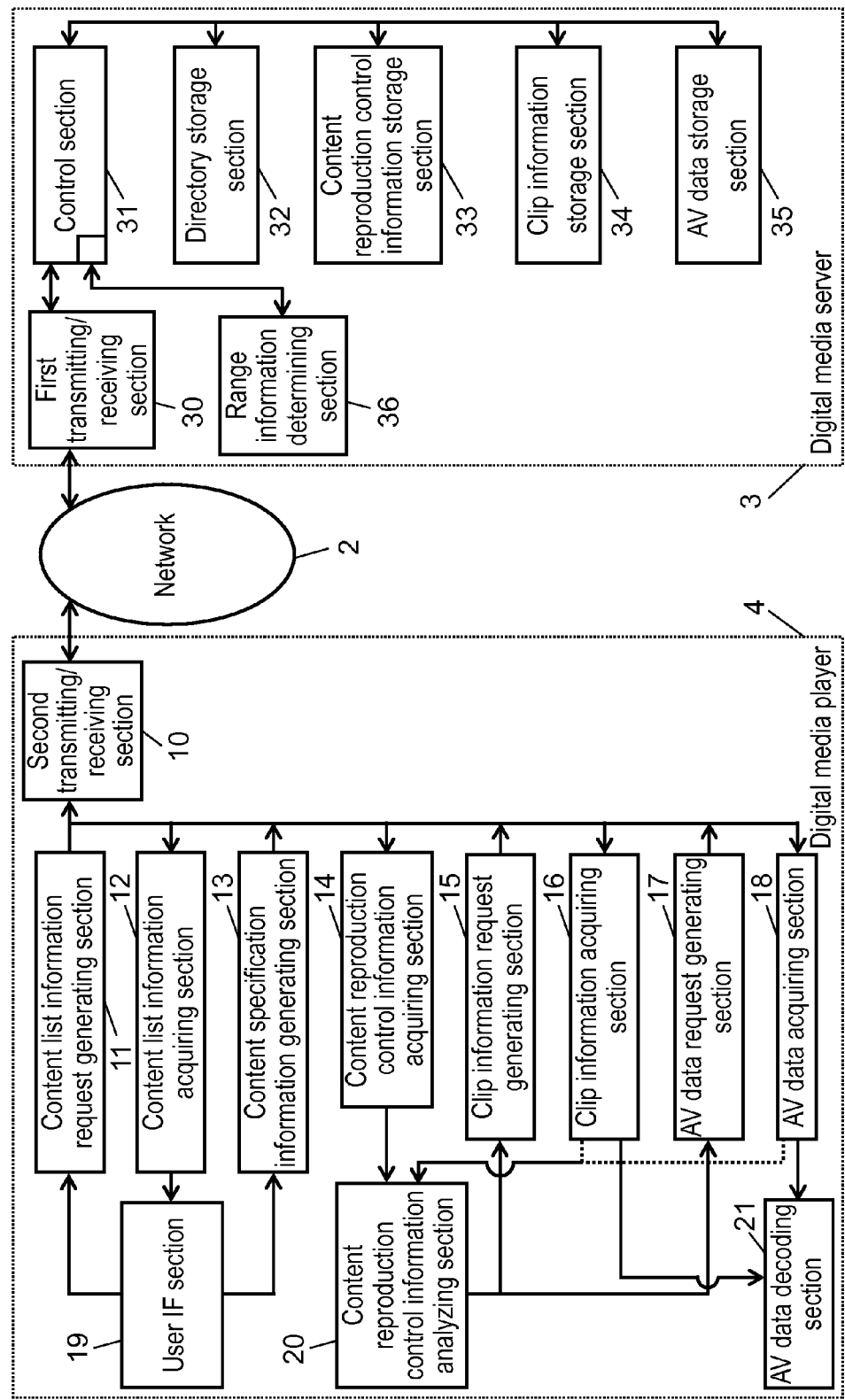
FIG. 1 is a block diagram showing one example of a configuration of a content reproduction system in accordance with a first exemplary embodiment of the present invention.

FIG. 1 is a block diagram showing one example of a configuration of a content reproduction system in accordance with a first exemplary embodiment of the present invention. In FIG. 1, digital media server 3 and digital media player 4 are coupled to network 2. Digital media server 3 as a server includes first transmitting/receiving section 30, control section 31, directory storage section 32, content reproduction control information storage section 33, clip information storage section 34, AV data storage section 35, and range information determining section 36. The connection relationship between these sections is shown in FIG. 1. The relationship between these sections is described later together with operation of each section. Digital media player 4 includes second transmitting/receiving section 10, content list information request generating section 11, content list information acquiring section 12, content specification information generating section 13, content reproduction control information acquiring section 14, clip information request generating section 15, clip information acquiring section 16, AV data request generating section 17, AV data acquiring section 18, user interface (IF) section 19, content reproduction control information analyzing section 20, and AV data decoding section 21. The connection relationship between these sections is shown in FIG. 1, and is described during description of the operation of each section. Digital media player 4 is a content reproduction device for reproducing a content consisting of AV data supplied from digital media server 3.

Figure 2:
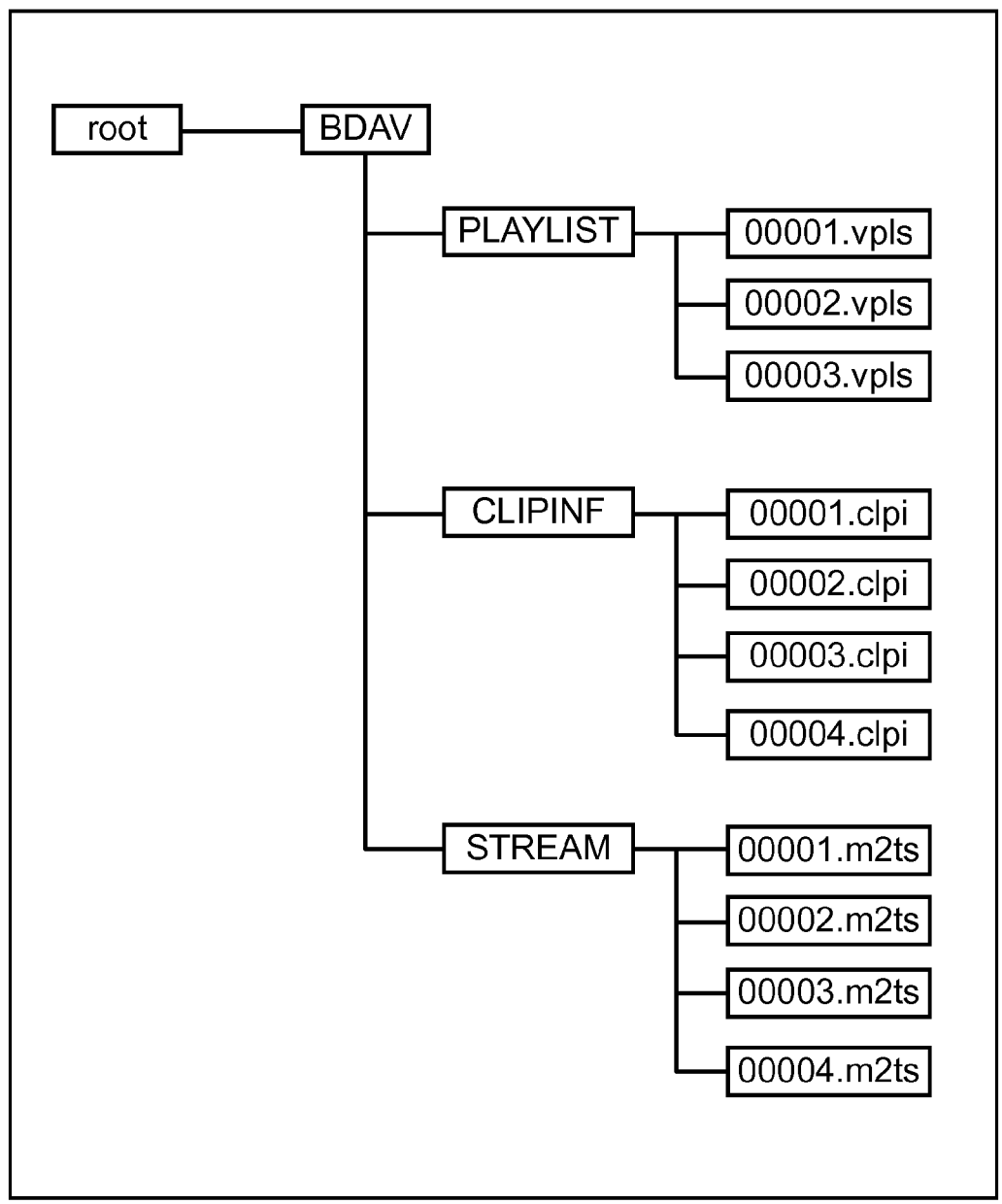
FIG. 2 is a schematic diagram showing a managing structure of a data file of the content reproduction system in accordance with the first exemplary embodiment of the present invention.

Next, AV data, clip information, and content reproduction control information stored and accumulated in digital media server 3 are described. FIG. 2 is a schematic diagram showing a managing structure of a data file of the content reproduction system in accordance with the first exemplary embodiment of the present invention. In FIG. 2, the managing structure of respective data files of the AV data, clip information, and content reproduction control information is shown. The data files are managed hierarchically by a directory structure on a recording medium. On the recording medium, one directory (root directory in the example of FIG. 2) is firstly prepared. The levels under this directory are assumed to be managed by one recording/reproducing system.

Directory [BDAV] is placed under the root directory. Play list directory [PLAYLIST], clip information directory [CLIPINF], and stream directory [STREAM] of the AV data are placed under BDAV directory [BDAV].

Play list directory [PLAYLIST] is a directory for the content reproduction control information, namely for the database of play lists. In other words, play list directory [PLAYLIST] stores play list file [xxxxx.vpls], which is a file related to the play list as control information for controlling the reproducing form of contents. Play list file [xxxxx.vpls] is a file prepared for each content. Play list file is edited by a user, and allows referring to a plurality of AV data segments in some cases. In this file name, [xxxxx] before [.] (period) is a five-digit number, and [vpls] after the period is an extension specific to this type of files.

Clip information directory [CLIPINF] is a directory for the database of the clip information. In other words, clip information directory [CLIPINF] stores clip information file [zzzzz.clpi] for storing attribute information for each AV data file. In this file name, [zzzzz] before [.] (period) is a five-digit number, and [clpi] after the period is an extension specific to this type of files.

Stream directory [STREAM] is a directory for the AV data file as an entity. In other words, stream directory [STREAM] stores an AV data file as the AV data corresponding to each clip information file. The AV data file includes a transport stream (hereinafter referred to as "MPEG2 TS") of a moving pictures experts group 2 (MPEG2). The file name is [zzzzz.m2ts]. In this file name, [zzzzz] before the period is set to be the same as that of the corresponding clip information file, so that the correspondence between the clip information file and AV data file can be easily obtained.

Figure 3:
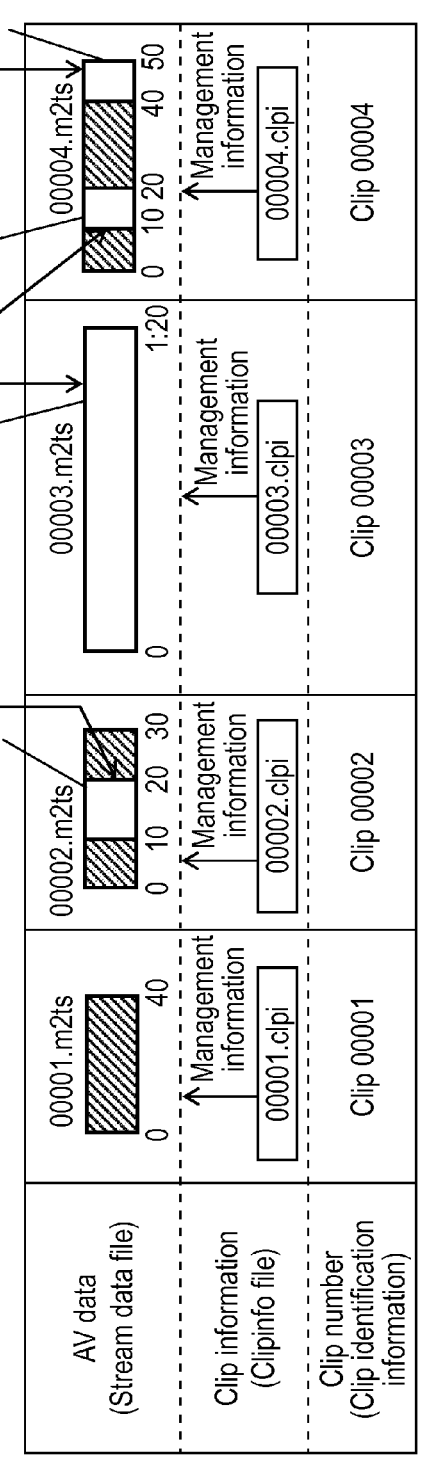
FIG. 3 is a schematic diagram illustrating one example of a play list, clip identification information, clip information, and AV data used in the content reproduction system in accordance with the first exemplary embodiment of the present invention.
Figure 4:
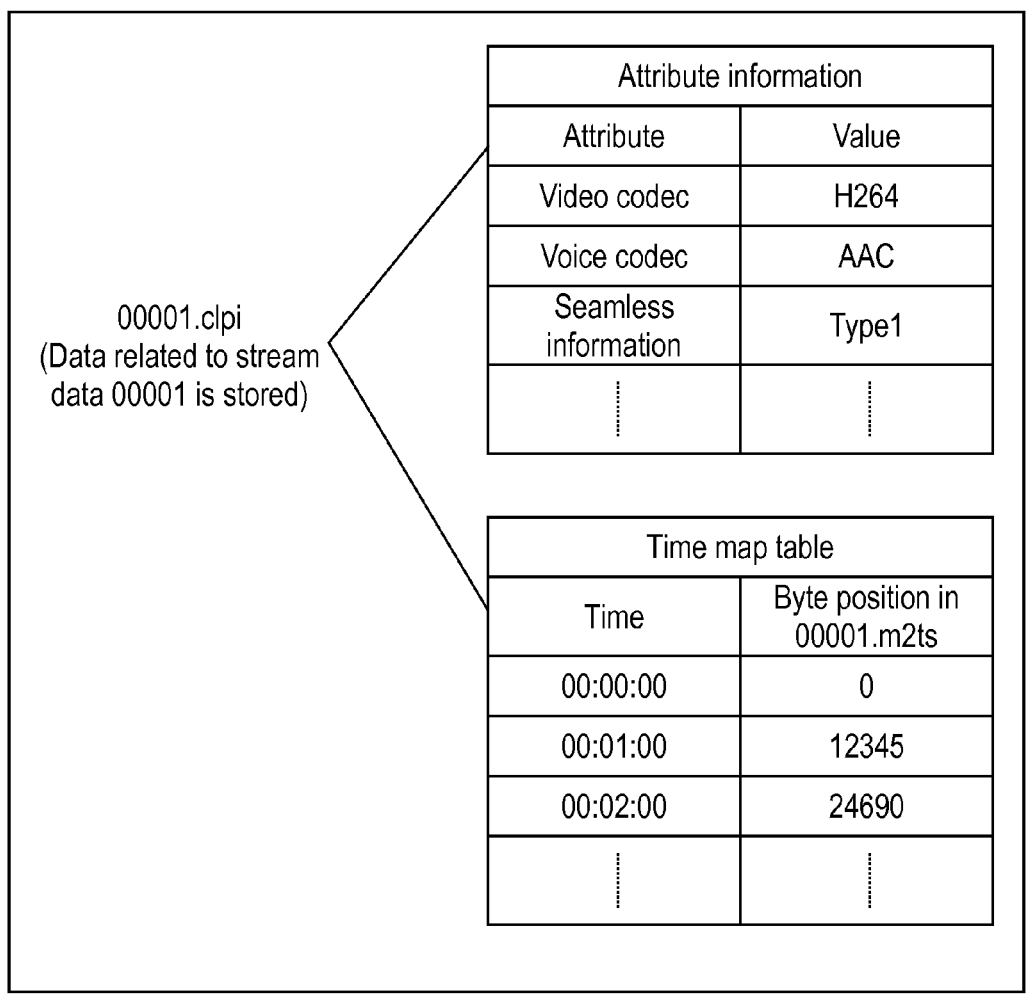
FIG. 4 is a schematic diagram showing one example of the clip information.

FIG. 3 is a schematic diagram showing one example of a play list, clip identification information, clip information, and AV data used in the content reproduction system in accordance with the first exemplary embodiment of the present invention. It is assumed that four AV data segments [00001.m2ts], [00002.m2ts], [00003.m2ts], and [00004.m2ts] of a stream file form are stored in AV data storage section 35. Clip information [00001.clpi], [00002.clpi], [00003.clpi], and [00004.clpi] of a Clipinfo form are prepared as management information for AV data segments [00001.m2ts], [00002.m2ts], [00003.m2ts], and [00004.m2ts], respectively, and are stored in clip information storage section 34. Pairs of AV data and clip information are clips [Clip00001], [Clip00002], [Clip00003], and [Clip00004], and are identified using clip number. Therefore, the clip number is used synonymously with the clip identification information. The clip identification information indicates the location of the clip information and also the location of the AV data. This is because, when the database of directories [CLIPINF] and [STREAM] is referred to based on the clip identification information, an address that corresponds to the clip identification information and at which the clip information and AV data are stored is acquired. In other words, AV data storage section 35 stores a plurality of AV data segments. Clip information storage section 34 stores the clip information as the management information of the AV data. The clip information is constituted by information related to the corresponding AV data as shown in FIG. 4. Specifically, the clip information includes information showing the mode of a video codec and voice codec, attribute information such as information showing the seamless type, and a time map table showing the relationship between the time stamp value such as reproducing time and the byte position of the AV data.

Play list [00001.vpls] in FIG. 3 is one example of the content reproduction information. Play list [00001.vpls] defines the reproduction order by digital media player 4. In other words, the reproduction order is defined by the order of the column of the reproduction order. The column of the reproduction order shows sequentially arranged [playitem1] through [playitem4]. First, in [playitem1], the part of time positions [00:10:00] to [00:20:00] of [Clip00004], namely the part of 10 to 20 (minutes) of AV data 41, is reproduced. Next, in [playitem1], the part of time positions [00:00:00] to [01:20:00] of [Clip00003], namely AV data 42 part, is reproduced. Next, in [playitem3], the part of time positions [00:10:00] to [00:20:00] of [Clip00002], namely AV data 43 part, is reproduced. Next, in [playitem4], the part of time positions [00:40:00] to [00:50:00] of [Clip00004], namely AV data 44 part, is reproduced.

Thus, the play list can specify a reproduction order of one or more AV data segments using [referred clip number], and can select any reproduction part by specifying a reproduction start time and a reproduction end time of each AV data segment using [time position in clip]. In other words, the information of [time position in clip] is reproduction permitted range specification information that enables masking of a part that is not intended to be seen and reproducing of only a part that is intended to be seen. The play list specifies the reproduction permitted range specification information using time. When the AV data is reproduced actually, however, the time map table of the clip information shown in FIG. 4 is referred to, the time specification is converted into the byte specification, and the AV data reproduction control from a reproduction start byte position to a reproduction end byte position is performed.

The directories illustrated in FIG. 2 are stored in directory storage section 32. The contents of the play list are stored in content reproduction control information storage section 33. The play list is used synonymously with the content reproduction control information. In other words, content reproduction control information storage section 33 stores the content reproduction control information that defines the reproduction order of the AV data segments in a content consisting of the AV data segments. As discussed above, the content reproduction control information includes information for identifying the clip information, and information showing the reproduction range of the AV data. The clip information of each clip is stored in clip information storage section 34. The AV data of each clip is stored in AV data storage section 35.

Figure 5:
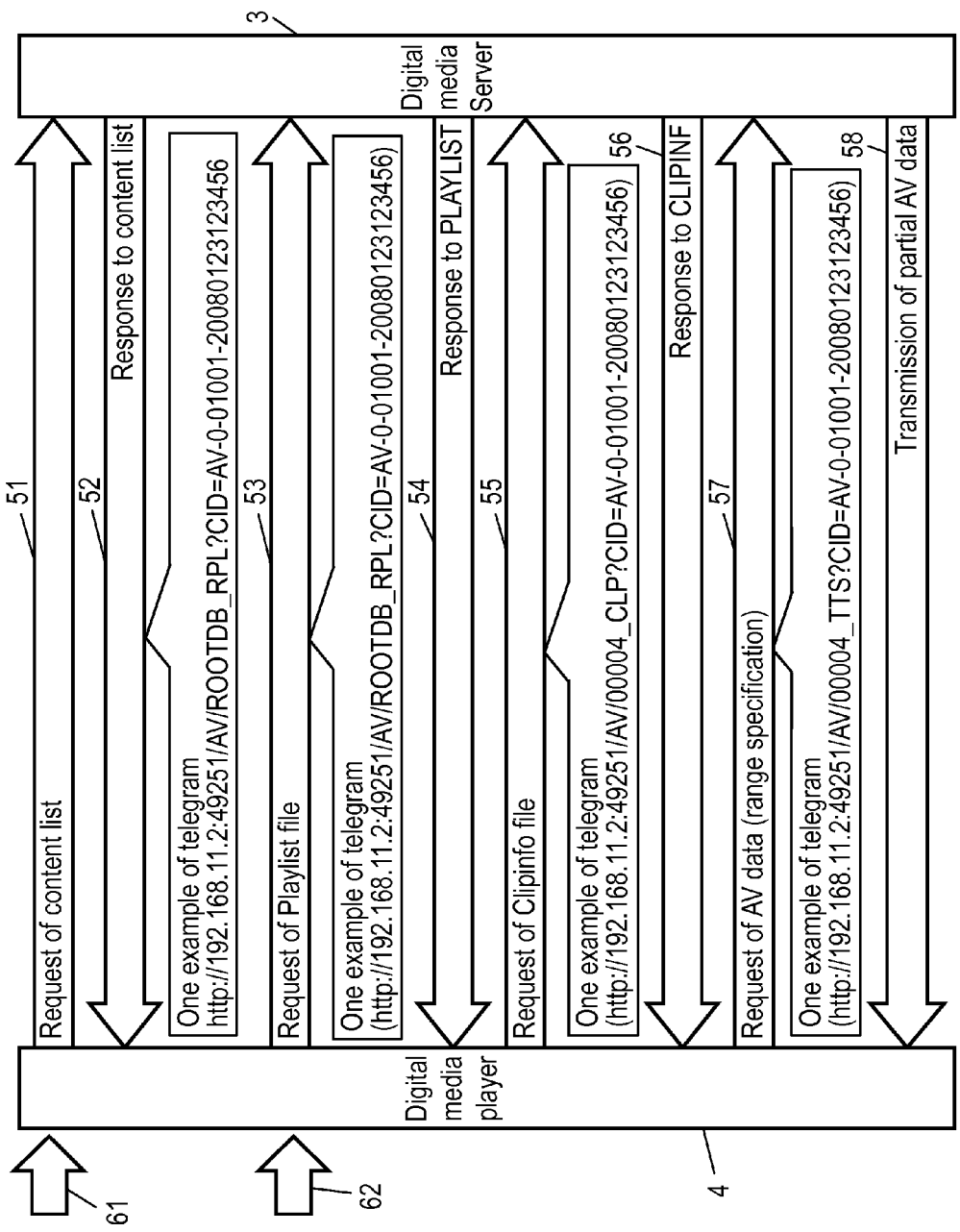
FIG. 5 is a schematic diagram showing the procedure of transmission/reception of a communication telegram of the content reproduction system in accordance with the first exemplary embodiment of the present invention.

Next, the operation of the content reproduction system of the present invention is described using FIG. 1 and FIG. 5. FIG. 5 is a schematic diagram showing the procedure of transmission/reception of a communication telegram of the content reproduction system in accordance with the first exemplary embodiment of the present invention. FIG. 5 shows the procedure of transmission/reception of the communication telegrams between digital media player 4 and digital media server 3. Arrow 51 shows request of a content list, arrow 52 shows response to the content list, arrow 53 shows request of a Playlist file, arrow 54 shows response to PLAYLIST, arrow 55 shows request of a Clipinfo file, arrow 56 shows response to CLIPINF, arrow 57 shows request of AV data (range specification), and arrow 58 shows transmission of partial AV data. Details of all of these telegrams are described later using examples.

In FIG. 1, user IF section 19 includes a content list information request button, a display for displaying content list information, and a content selection button for selecting a content that desires reproduction from a content list based on the content list information (not shown).

As shown in arrow 61 of FIG. 5, first, a user pushes the content list information request button to request the content list. Then, content list information request generating section 11 generates a telegram for request of the content list of arrow 51, and transmits it from second transmitting/receiving section 10 to network 2.

First transmitting/receiving section 30 of digital media server 3 receives the telegram for request of the content list of arrow 51. First transmitting/receiving section 30 then delivers the telegram for request of the content list to control section 31. Control section 31 interprets the telegram, and reads, according to the request, the content list information consisting of one or more play lists from content reproduction control information storage section 33. Control section 31 generates a telegram for response to the content list of arrow 52, and transmits it from first transmitting/receiving section 30 to network 2.

Second transmitting/receiving section 10 receives the telegram for response to the content list of arrow 52. Second transmitting/receiving section 10 delivers the telegram for response to the content list to content list information acquiring section 12. Content list information acquiring section 12 interprets the telegram, generates a content list from the content list information, and delivers it to user IF section 19. User IF section 19 displays the content list on the display.

Next, as shown in arrow 62 of FIG. 5, the user operates the content selection button, and selects a content intended to be reproduced from the content list. User IF section 19 delivers the identification information of the selected content to content specification information generating section 13. Content specification information generating section 13 generates a telegram for request of a Playlist file of arrow 53, and transmits it from second transmitting/receiving section 10 to network 2.

First transmitting/receiving section 30 of digital media server 3 receives the telegram for request of a Playlist file of arrow 53. First transmitting/receiving section 30 then delivers the telegram for request of the Playlist file to control section 31. Control section 31 interprets the telegram, and reads, according to the request, the content reproduction control information related to the specified content from content reproduction control information storage section 33. Control section 31 generates a telegram for response to PLAYLIST of arrow 54, and transmits it from first transmitting/receiving section 30 to network 2.

Second transmitting/receiving section 10 receives the telegram for response to PLAYLIST of arrow 54. Second transmitting/receiving section 10 delivers the telegram for response to PLAYLIST to content reproduction control information acquiring section 14. Content reproduction control information acquiring section 14 interprets the telegram, and acquires the content reproduction control information. Content reproduction control information acquiring section 14 delivers the content reproduction control information to content reproduction control information analyzing section 20. Content reproduction control information analyzing section 20 extracts the clip number (clip identification information) corresponding to playitem included in the content reproduction control information, and delivers the extracted clip number to clip information request generating section 15 and AV data request generating section 17. Clip information request generating section 15 generates a telegram for request of a Clpinfo file of arrow 55 including URL for requesting the clip information based on the clip number. At this time, clip information request generating section 15 generates the telegram for request of the Clpinfo file while applying a conversion rule shown in FIG. 6, and transmits it from second transmitting/receiving section 10 to network 2. The conversion rule shown in FIG. 6 is described later in detail.

First transmitting/receiving section 30 of digital media server 3 receives the telegram for request of the Clpinfo file of arrow 55. First transmitting/receiving section 30 then delivers the telegram for request of the Clpinfo file to control section 31. Control section 31 interprets the telegram, and reads, according to the request, the clip information related to the specified clip from clip information storage section 34. Control section 31 generates a telegram for response to CLIPINF of arrow 56, and transmits it from first transmitting/receiving section 30 to network 2.

Second transmitting/receiving section 10 receives the telegram for response to CLIPINF of arrow 56. Second transmitting/receiving section 10 delivers the telegram for response to CLIPINF to clip information acquiring section 16. Clip information acquiring section 16 interprets the telegram, and delivers the attribute information related to Clip00004 to AV data decoding section 21. Clip information acquiring section 16, on acquiring the clip information, informs content reproduction control information analyzing section 20 of this acquirement. Then, content reproduction control information analyzing section 20 commands AV data request generating section 17 to generate a telegram for request of AV data (range specification) of arrow 57 including URL for requesting the AV data based on the clip number. At this time, AV data request generating section 17 generates a telegram for request of the AV data (range specification) while applying the conversion rule shown in FIG. 6. AV data request generating section 17 transmits the telegram for request of the AV data (range specification) of arrow 57 from second transmitting/receiving section 10 to network 2. Information [start time] and [end time] of [time position in clip] in the play list shown in FIG. 3 is converted into [start byte position] and [end byte position] referring to the time map table of the clip information shown in FIG. 4, and can be mounted as range specification information on the telegram for request of the AV data (range specification) of arrow 57. This range specification information is called request range specification information.

First transmitting/receiving section 30 of digital media server 3 receives the telegram for request of the AV data (range specification) of arrow 57. First transmitting/receiving section 30 then delivers the telegram for request of the AV data (range specification) to control section 31. Control section 31 interprets the telegram, and reads, according to the request, the AV data based on the clip number from AV data storage section 35. Control section 31 mounts the AV data on the telegram for transmission of the partial AV data of arrow 58, and transmits it from first transmitting/receiving section 30 to network 2.

When information [start byte position] and [end byte position] as the request range specification information is mounted on the telegram for request of the AV data (range specification) of arrow 57, control section 31 extracts the request range specification information from the telegram. Control section 31 then delivers the request range specification information to range information determining section 36. Control section 31 searches directory storage section 32 for the storage position of the corresponding play list, and reads the corresponding playitem, namely the information [start time] and [end time] of [time position in clip] of the clip number, from content reproduction control information storage section 33. Control section 31 delivers them as reproduction permitted range specification information to range information determining section 36. Control section 31 further reads the corresponding clip information from clip information storage section 34, and delivers it to range information determining section 36. Range information determining section 36 converts the reproduction permitted range specification information into byte specification referring to the time map table of the corresponding clip information, and determines whether the request range specification information exceeds the range of the reproduction permitted range specification information having been converted into the byte specification. When the request range specification information is within the permitted range, range information determining section 36 permits control section 31 to generate the telegram for transmission of the partial AV data of arrow 58. When the request range specification information exceeds the permitted range, range information determining section 36 prohibits control section 31 from generating and transmitting the telegram for transmission of the partial AV data of arrow 58, and makes control section 31 transmit an error message as error information to digital media player 4. In this case, for determining whether the request range specification information exceeds the range of the reproduction permitted range specification information, the reproduction permitted range specification information is converted into the byte specification. Alternatively, the request range specification information may be converted into time specification, and may be compared with the reproduction permitted range specification information.

The telegram for transmission of the partial AV data of arrow 58 is received by second transmitting/receiving section 10 and delivered to AV data acquiring section 18. AV data acquiring section 18 interprets the telegram, and delivers the AV data of Clip00004 to AV data decoding section 21. AV data decoding section 21 decodes the stream of the AV data and outputs an image signal and voice signal to a display device such as a television.

When the reception of the AV data of Clip00004 is completed, AV data acquiring section 18 informs content reproduction control information analyzing section 20 of the completion of the reception. Content reproduction control information analyzing section 20 delivers the clip number corresponding to the next playitem to clip information request generating section 15 and AV data request generating section 17. Thus, for a new clip number, the telegrams for request of a Clipinfo file of arrow 55, response to CLIPINF of arrow 56, request of AV data (range specification) of arrow 57, and transmission of partial AV data of arrow 58 are generated, transmitted, and received. The operations of the request of a Clipinfo file of arrow 55 to the transmission of partial AV data of arrow 58 are sequentially repeated for playitem5 included in the content reproduction control information. When the reproduction of all playitems is completed, a series of operations are completed. When the number of playitems is only one, such repetition is not performed inevitably.

When digital media player 4 receives an error message as the error information above-mentioned, digital media player 4 may make user IF section 19 display a message such as [cannot be reproduced] or [start again from beginning]. The request range specification information usually matches with the reproduction permitted range specification information, so that the error message is not generated. When a transmission error occurs during transmission/reception of the data of the play list or transmission/reception of the range specification information, however, a mismatch between the request range specification information and the reproduction permitted range specification information can occur. Thus, range information determining section 36 prevents an accident that a part of the AV data of which reproduction is not permitted by the play list stored in content reproduction control information storage section 33 is transmitted to digital media player 4.

Next, respective examples of the following telegrams are described in detail: request of a content list of arrow 51 of FIG. 5, response to the content list of arrow 52, request of a Playlist file of arrow 53, response to PLAYLIST of arrow 54, request of a Clipinfo file of arrow 55, response to CLIPINF of arrow 56, request of AV data (range specification) of arrow 57, and transmission of partial AV data of arrow 58.

The telegram for request of the content list of arrow 51 of FIG. 5 may be any one as long as it indicates that digital media player 4 requests information such as a list of the contents from digital media server 3. FIG. 7 is a diagram showing one example of the telegrams of the content reproduction system in accordance with the first exemplary embodiment of the present invention. The telegrams shown in FIG. 7 conform to a guideline of the DLNA. In other words, in the content reproduction system of the first exemplary embodiment, digital media player 4 as a content reproduction device communicates with digital media server 3 as a server under a communication protocol conforming to the DLNA (Digital Living Network Alliance) standard.

The telegram for response to the content list of arrow 52 of FIG. 5 shows the URL of the play list (PlayList) transmitted to digital media player 4 by digital media server 3. This telegram includes, as an example, information of [http://192.168.11.2:49251/AV/ROOTDB_VPL?CID=AV-0-01001-20080123123456]. In this information, part [192.168.11.2:49251] shows the Internet protocol (IP) address and port number of digital media server 3, part [ROOTDB_VPL] shows the directory of [PLAYLIST] of FIG. 2, and part [CID=AV-0-01001-20080123123456] shows identification ID as the identification information of the play list. When there is a plurality of contents, there is also a plurality of play lists, and a plurality of URLs of the play lists (PlayList) is included in the telegram for response to the content list of arrow 52. FIG. 8, FIG. 9, and FIG. 10 show examples of a further detailed telegram for response to the content list of arrow 52, and parts surrounded by a broken line show the play list information. One telegram is constituted by FIG. 8, FIG. 9, and FIG. 10. The telegram for response to the content list of arrow 52 of FIG. 5 shows list information of three play lists. In the information of each play list surrounded by each broken line, the information of the URL related to the present invention is provided after [my:PlayList=]. The URLs of three play lists are [http://192.168.11.2:49251/AV/ROOTDB_VPL?CID=AV-0-01001-20080123123456], [http://192.168.11.2:49251/AV/ROOTDB_VPL?CID=AV-0-01001-20080123123012], and [http://192.168.11.2:49251/AV/ROOTDB_VPL?CID=AV-0-01001-20080123123789].

In the description of FIG. 2 and FIG. 3, a five-digit number such as [00001.vpls] is used as the identification information of the play list. In directory storage section 32, additional directories [root], [BDAV], and [PLAYLIST] are sometimes disposed for each medium such as a memory card, a DVD-ROM, a DVD-RAM, and a Blu-ray disc. In this case, when five-digit numbers are employed, the same number can be used in respective directories. Therefore, as the ID for identifying the play list in the whole storage area of directory storage section 32, the information of the form such as [CID=AV-0-01001-20080123123456] is used as the URL. This is information for indicating the location of the content reproduction control information.

The telegram for request of a Playlist file of arrow 53 of FIG. 5 takes a form shown in the example of the telegram for request of the Playlist file of FIG. 11A. This telegram requests the first play list, and corresponds to the operation in which a user selects the first play list.

The telegram for response to PLAYLIST of arrow 54 of FIG. 5 takes a form shown in the example of the telegram for response to the Playlist file of FIG. 11B. After [CONTENT-LENGTH:28344], the content of the table of play list [00001.vpls] shown in FIG. 3 is added as binary data. The telegram for request of a Clipinfo file of arrow 55 of FIG. 5 takes a form shown in the example of the telegram for request of the Clipinfo file of FIG. 11C. In this telegram, part [00004_CLP] in [GET/AV/00004_CLP?CID=AV-0-01001-20080123123456 HTTP/1.1] indicates the clip information as the clip number of the first playitem1 of the play list. [HOST:192.168.11.2:49251] indicates digital media server 3.

The telegram for response to CLIPINF of arrow 56 of FIG. 5 takes a form shown in the example of the telegram for response to the Clipinfo file of FIG. 11D. After [CONTENT-LENGTH:18344], the content of clip information [00004.clpi] as shown in FIG. 4 is disposed as binary data.

The telegram for request of AV data (range specification) of arrow 57 of FIG. 5 takes a form shown in the example of the telegram for request of the AV data of FIG. 11E. In this telegram, part [00004_TTS] in [GET/AV/00004_TTS?CID=AV-0-01001-20080123123456 HTTP/1.1] indicates the AV data as the clip number of the first playitem1 of the play list. [HOST:192.168.11.2:49251] indicates digital media server 3. Part [Range:bytes=12345-24690] shows information of the byte position of the AV data corresponding to [time position in clip], [start time], and [end time] of clip number 00004 of the first playitem1 of the play list of FIG. 4, and requests selection and transmission of the AV data in this range.

The telegram for transmission of partial AV data of arrow 58 of FIG. 5 takes a form shown in the example of the telegram for transmission of partial AV data of FIG. 11F. After [Content-Range:bytes=12345-24690], data of 12345-th to 24690-th bytes of AV data [00004.m2ts] comes as binary data.

FIG. 6 is a diagram illustrating a structure of the URL and a conversion rule in the content reproduction system in accordance with the first exemplary embodiment of the present invention. FIG. 6 shows the conversion rule that a URL indicating the location of clip information and AV data is generated by converting a part of the URL indicating the location of the content reproduction control information during the generation of the telegrams. This conversion rule is stored in a storage section (not shown). This conversion rule is used when content reproduction control information analyzing section 20 makes clip information request generating section 15 generate the telegram for request of a Clipinfo file of arrow 55 of FIG. 5, and when content reproduction control information analyzing section 20 makes AV data request generating section 17 generate the telegram for request of AV data (range specification) of arrow 57.

The URL of the play list, namely [http://[IP address of server+port number]xxxxxROOTDB_VPL?[ID of play list], is acquired by digital media player 4 in response to the content list of arrow 52 of FIG. 5 or in response to PLAYLIST of arrow 54. This information is first location information for indicating the location of the content reproduction control information. In other words, the first location information for indicating the location of the content reproduction control information is a URL for indicating the location of the content reproduction control information. As discussed above, first transmitting/receiving section 30 at least transmits, to network 2, the AV data, the clip information, the content reproduction control information, and first location information for indicating the location of the content reproduction control information. Second transmitting/receiving section 10 at least receives, from network 2, the AV data, the clip information, the content reproduction control information, and the first location information for indicating the location of the content reproduction control information.

The URL of Clipinfo, namely [http://[IP address of server+port number]xxxxx[clip number]_CLP?[ID of play list], is acquired by converting "ROOTDB_VPL" of the URL of the play list into "[clip number]_CLP". This information is second location information for indicating the location of the clip information. In other words, clip information request generating section 15 generates the second location information for indicating the location of the clip information corresponding to the clip identification information based on the predetermined conversion rule and the first location information, and requests digital media server 3 to acquire the clip information. Clip information acquiring section 16 acquires the clip information corresponding to the clip identification information from the location indicated by the second location information.

The URL of the AV data, namely [http://[IP address of server+port number]xxxxx[clip number]_TTS?[ID of play list], is acquired by converting "ROOTDB_VPL" of the URL of the play list into "[clip number]_TTS". This information is third location information for indicating the location of the AV data. In other words, AV data request generating section 17 generates the third location information for indicating the location of the AV data corresponding to the clip identification information based on the predetermined conversion rule and the first location information, and requests digital media server 3 to acquire the AV data. AV data acquiring section 18 acquires the AV data corresponding to the clip identification information from the location indicated by the third location information.

Thus, in the content reproduction system of the present invention, the clip information and the AV data required for content reproduction can be requested by a simple processing operation of converting a part of the URL of the play list into the information (clip identification information) of the clip number. Therefore, a reproduction environment can be previously set by previous access to the URL of the clip information, and the seamless reproduction can be performed further smoothly.

In the above-mentioned description, a part of the URL of the play list included in the content reproduction control information is converted to generate the URLs of the clip information and AV data. Alternatively, the URL of the play list, namely the URL of the content reproduction control information, is included also in the content list information, so that the URLs of the clip information and AV data may be generated based on the content list information.

Digital media player 4 of FIG. 1, as discussed above, includes content list information request generating section 11, content list information acquiring section 12, content specification information generating section 13, content reproduction control information acquiring section 14, clip information request generating section 15, clip information acquiring section 16, AV data request generating section 17, AV data acquiring section 18, and content reproduction control information analyzing section 20. These sections can be formed of dedicated hardware (dedicated circuit) for processing various telegrams and information which have been described. Alternatively, these sections can be usually formed of software because the operation functions of the components except second transmitting/receiving section 10 and user IF section 19 are processing of the telegrams and information. In other words, the operation functions are previously described by software and stored in a ROM, and the software is executed on a common micro processing unit (MPU) or memory. Here, as the ROM, a nonvolatile recording medium such as a rewritable ROM is preferable, but a volatile recording medium can be also employed.

Directory storage section 32, content reproduction control information storage section 33, clip information storage section 34, and AV data storage section 35 of digital media server 3 of FIG. 1 are preferably formed of a nonvolatile mass-storage recording medium such as a hard disk drive. Alternatively, a volatile recording medium can be also employed. Control section 31 and range information determining section 36 can be formed of dedicated hardware (dedicated circuit) for processing various telegrams and information. Alternatively, the processing of various telegrams and information can be usually executed by software. In other words, the above-mentioned operation functions are previously described by software and stored in a ROM, and the software is executed on a common MPU or memory. Here, as the ROM, a nonvolatile recording medium such as a rewritable ROM or a hard disk drive is preferable, and a volatile recording medium can be also employed.

Figure 12:
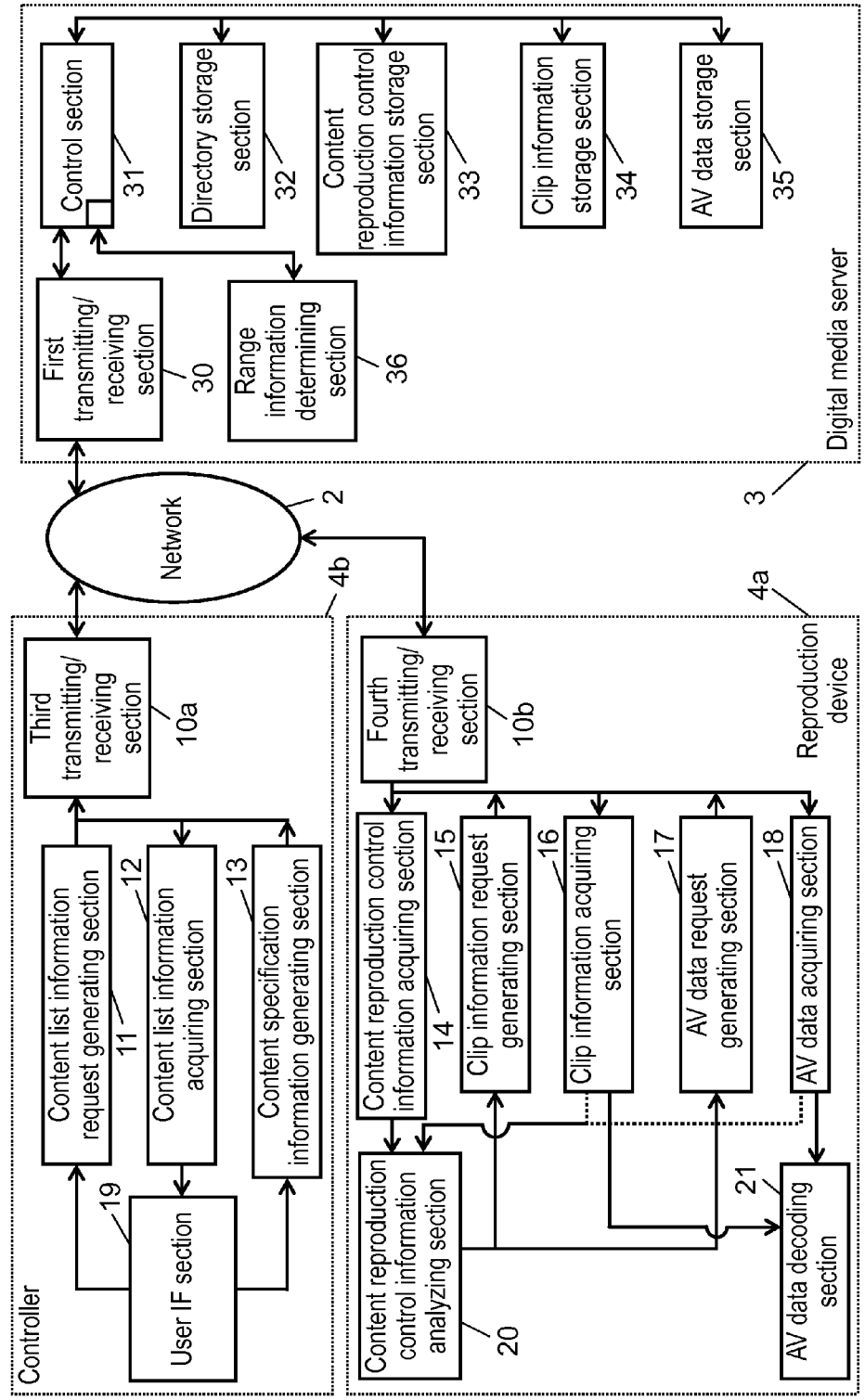
FIG. 12 is a block diagram showing another example of the configuration of the content reproduction system in accordance with the first exemplary embodiment of the present invention.

In the content reproduction system of the present embodiment, digital media server 3 and digital media player 4 are coupled to network 2. However, another content reproduction system having the configuration shown by the block diagram of FIG. 12 may be employed. FIG. 12 is a block diagram showing another example of the configuration of the content reproduction system in accordance with the first exemplary embodiment of the present invention. The another content reproduction system has network 2 and digital media server 3 similar to those of the content reproduction system of the present embodiment, and has digital media player 4 different from that of the content reproduction system of the present embodiment. In other words, the another content reproduction system has reproduction device 4a and controller 4b instead of digital media player 4.

Reproduction device 4a includes third transmitting/receiving section 10a, content list information request generating section 11, content list information acquiring section 12, content specification information generating section 13, and user IF section 19. Controller 4b includes fourth transmitting/receiving section 10b, content reproduction control information acquiring section 14, clip information request generating section 15, clip information acquiring section 16, AV data request generating section 17, AV data acquiring section 18, content reproduction control information analyzing section 20, and AV data decoding section 21. FIG. 12 shows the connection relationship between these sections. In FIG. 12, elements having a configuration and function similar to those in the content reproduction system of the present embodiment are denoted with the same reference marks, and the descriptions of those elements are omitted.

An element formed by integrating reproduction device 4a and controller 4b of the another content reproduction system has a function similar to that of digital media player 4 of the present embodiment. An element formed by integrating third transmitting/receiving section 10a and fourth transmitting/receiving section 10b is similar to second transmitting/receiving section 10. Third transmitting/receiving section 10a and fourth transmitting/receiving section 10b are may be formed of hardware similar to that of first transmitting/receiving section 10.

The another content reproduction system has reproduction device 4a and controller 4b instead of digital media player 4, but the operation function thereof is similar to that of the content reproduction system of the present embodiment. By using a plurality of reproduction devices 4a, a system allowing simultaneous viewing of different contents can be constructed. By using a plurality of reproduction devices 4a and a plurality of controllers 4b, a system allowing a plurality of users to simultaneously view different contents can be easily constructed. In any case, the number of digital media servers 3 may be one. When the number of digital media servers 3 is two or more, this system can be applied even when many users are assumed to view the system.

Second Exemplary Embodiment

Figure 13:
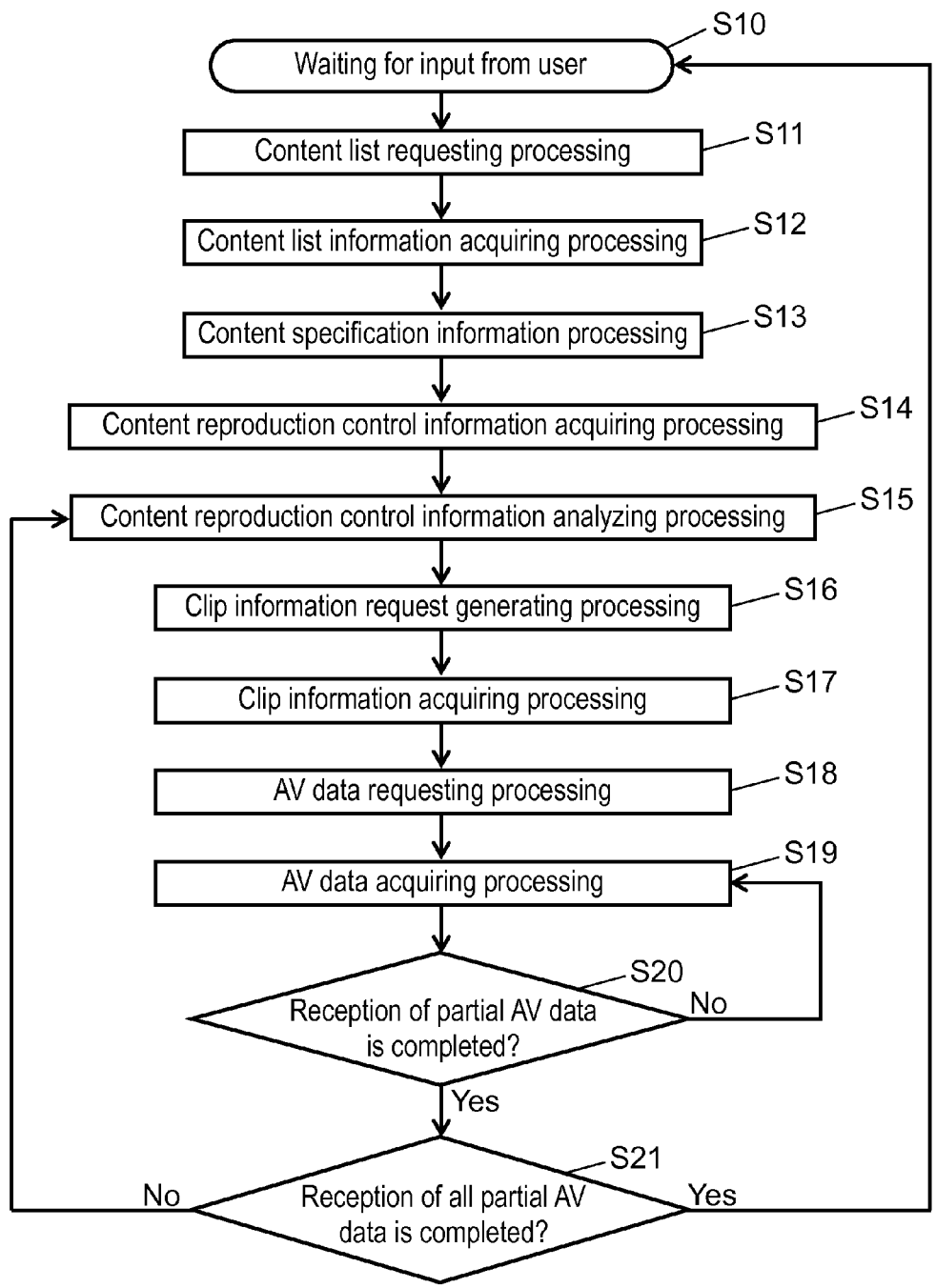
FIG. 13 is a flowchart of a content reproduction method in accordance with a second exemplary embodiment of the present invention.
Figure 14:
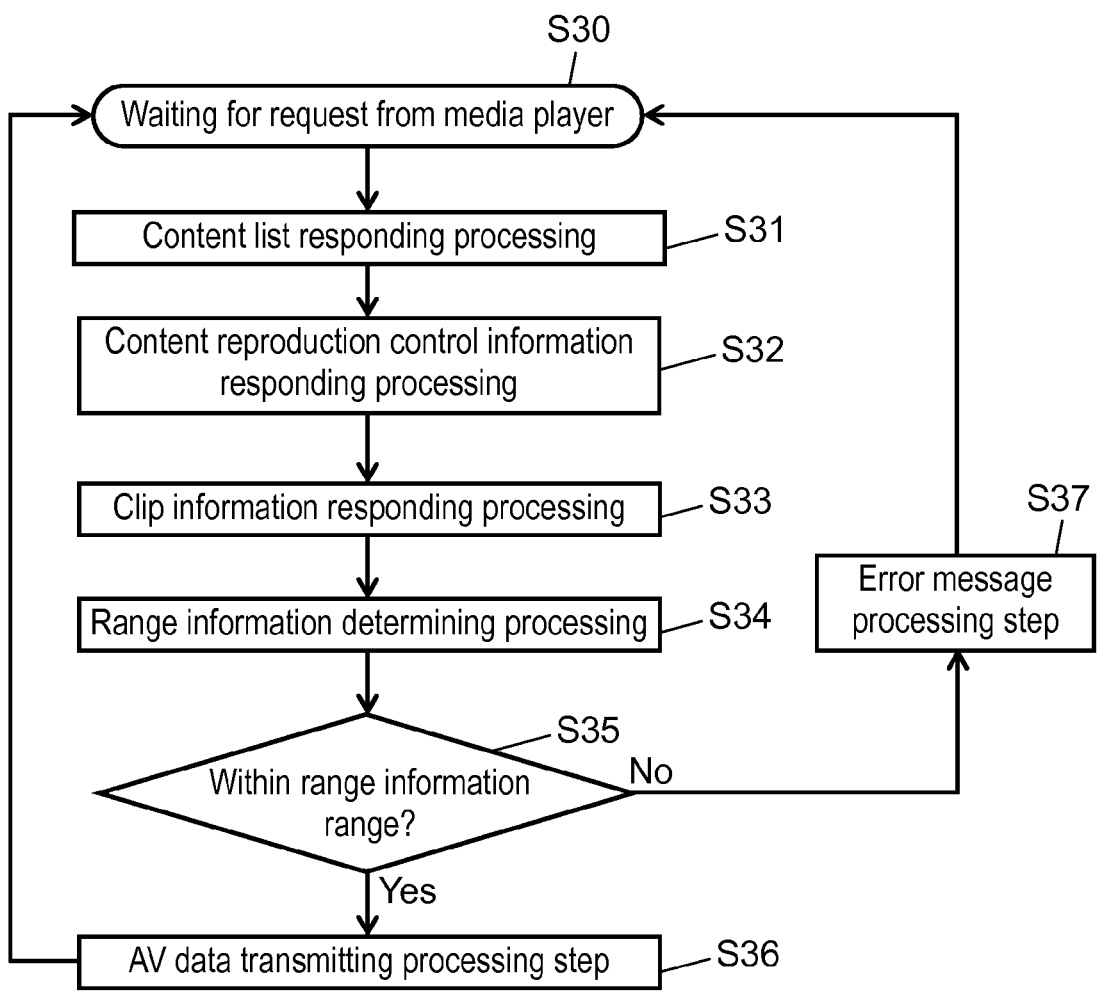
FIG. 14 is a flowchart of another content reproduction method in accordance with the second exemplary embodiment of the present invention.

The content reproduction system, content reproduction device, and server have been described in the first exemplary embodiment of the present invention. A content reproduction method in accordance with a second exemplary embodiment of the present invention is described. FIG. 13 and FIG. 14 are flowcharts for illustrating procedures of the content reproduction method in accordance with the second exemplary embodiment of the present invention. The configuration of the content reproduction system is described based on FIG. 1 through FIG. 12. The operation procedure of digital media player 4 is described based on the flowchart of FIG. 13.

Digital media player 4 is initially in a state of waiting for an input from a user in step S10. When the user pushes the content list information request button to request a content list, a content list requesting processing step is executed (step S11). In other words, in step S11, a telegram for request of a content list of arrow 51 of FIG. 5 is generated and transmitted, and digital media player 4 comes into a state of waiting for a response from network 2.

When digital media player 4 receives a telegram for response to the content list of arrow 52 of FIG. 5 from digital media server 3, a content list information acquiring processing step is executed (step S12). In step S12, digital media player 4 receives content list information, displays the content list on the display of user IF section 19, and comes into a state of waiting for an input from the user.

When the user operates the content selection button to select a content intended to be reproduced from the content list, a content specification information processing step is executed (step S13). In step S13, digital media player 4 generates and transmits a telegram for request of a Playlist file of arrow 53 of FIG. 5 that includes ID information of the play list as the identification information of the selected content, and comes into a state of waiting for a response from network 2.

When digital media player 4 receives a telegram for response to PLAYLIST of arrow 54 of FIG. 5 from digital media server 3, a content reproduction control information acquiring processing step is executed (step S14). In step S14, digital media player 4 receives a play list of the content selected by the user, and progresses to step S15. In other words, in the content reproduction control information acquiring processing step, the content reproduction control information is acquired based on the first location information that indicates the location of the content reproduction control information. Here, the content reproduction control information defines the reproduction order of the AV data segments in the content consisting of the AV data segments. As discussed above, the content reproduction control information includes information for indicating clip information and information for indicating the reproduction range of the AV data. The first location information for indicating the location of the content reproduction control information is a URL for indicating the location of the content reproduction control information. Then, based on the URL and the information for identifying the clip information, a URL for indicating the location of the clip information and a URL for indicating the location of the AV data are generated. This step is a URL generating step, and is included in Step S14.

Then, digital media player 4 executes a content reproduction control information analyzing processing step (step S15). In the content reproduction control information analyzing processing step, the arrangement and content of binary data of play list [00001.vpls] of FIG. 3 are analyzed, and a clip number and time position information corresponding to each play list are extracted. In other words, in the content reproduction control information analyzing processing step, one of the AV data segments and the clip identification information that identifies the clip information for managing the AV data segment are extracted from the content reproduction control information.

Then, digital media player 4 executes a clip information request generating processing step (step S16). In the clip information request generating processing step, second location information for indicating the location of the clip information corresponding to the clip identification information is generated based on the predetermined conversion rule and the first location information, and the clip information is requested from the location indicated by the second location information. In other words, digital media player 4 generates a telegram for request of a Clipinfo file of arrow 55 of FIG. 5, transmits it, and comes into a state of waiting for a response from network 2.

When digital media player 4 receives a telegram for response to CLIPINF of arrow 56 of FIG. 5 from digital media server 3, a clip information acquiring processing step is executed (step S17). In the clip information acquiring processing step, the clip information is acquired from the location indicated by the second location information. In other words, digital media player 4 extracts the clip information shown in FIG. 4 from the binary data of the clip information, and delivers it to AV data decoding section 21.

Then, digital media player 4 executes an AV data requesting processing step (step S18). In the AV data requesting processing step, third location information for indicating the location of the AV data corresponding to the clip identification information is generated based on the predetermined conversion rule and the first location information, and the AV data is requested from the location indicated by the third location information. In other words, digital media player 4 generates a telegram for request of AV data (range specification) of arrow 57 of FIG. 5, transmits it, and comes into a state of waiting for a response from network 2.

When digital media player 4 receives a telegram for transmission of partial AV data of arrow 58 of FIG. 5 from digital media server 3, digital media player 4 executes an AV data acquiring processing step (step S19). In the AV data acquiring processing step, the AV data is acquired from the location indicated by the third location information. In other words, digital media player 4 extracts the AV data of the stream form from the binary data of the AV data, and delivers it to AV data decoding section 21. Then, AV data decoding section 21 decodes the AV data acquired in step S19 based on the clip information acquired in step S17.

Then, digital media player 4 progresses to step S20. In other words, when the amount of the AV data of clip number 00001 of playitem1 is much, the telegram for transmission of partial AV data of arrow 58 of FIG. 5 is repeatedly transmitted. Therefore, when the telegram for transmission of partial AV data segments is repeatedly transmitted, firstly, digital media player 4 executes a determining step of partial AV data reception completion of determining whether the reception of partial AV data is completed (step S20). When the reception is not completed (No), digital media player 4 returns to step S19 and repeats the above-mentioned operation. When the reception of partial AV data is completed (Yes), digital media player 4 progresses to step S21. When transmission of a plurality of partial AV data segments is received, it is determined whether the reception of all partial AV data is completed in a determining step of all partial AV data reception completion (step S21). In other words, a plurality of partial AV data segments is received, digital media player 4 determines whether the reception of the AV data for all playitems is completed, namely whether the reception of the all partial AV data is completed. When the reception is not completed (No), digital media player 4 returns to step S15 and executes the processing of step S16 to step S20 for the clip number of the next playitem. When the reception of the AV data for all playitems is completed (Yes in step S21), digital media player 4 returns to the state of waiting for an input from the user in step S10.

The content of each telegram has been described in detail in the first exemplary embodiment, so that the description of them is omitted.

Next, the operation procedure of digital media server 3 is described based on the flowchart of FIG. 14. Digital media server 3 is initially in a state of waiting for a request from digital media player 4 (step S30).

When digital media server 3 receives the telegram for request of a content list of arrow 51 of FIG. 5 from digital media player 4, it progresses to step S31. Then, digital media server 3 executes a content list responding processing step (step S31). In other words, digital media server 3 generates a telegram for response to the content list of arrow 52 of FIG. 5, and transmits it. Then, digital media server 3 comes into a state of waiting for a response from network 2.

When digital media server 3 receives a telegram for request of a Playlist file of arrow 53 of FIG. 5 from digital media player 4, it progresses to step S32. Then, digital media server 3 executes a content reproduction control information responding processing step (step S32). In other words, digital media server 3 generates a telegram for response to PLAYLIST of arrow 54 of FIG. 5, and transmits it. Then, digital media server 3 comes into a state of waiting for a response from network 2.

When digital media server 3 receives a telegram for request of a Clipinfo file of arrow 55 of FIG. 5 from digital media player 4, it progresses to step S33. Then, digital media server 3 executes a clip information responding processing step of receiving the request range specification information for specifying the reproduction range of AV data from digital media player 4 (step S33). In other words, digital media server 3 generates a telegram for response to CLIPINF of arrow 56 of FIG. 5, and transmits it. Then, digital media server 3 comes into a state of waiting for a response from network 2.

When digital media server 3 receives a telegram for request of AV data (range specification) of arrow 57 of FIG. 5 from digital media player 4, it progresses to step S34. Then, digital media server 3 executes a range information determining processing step (step S34). In other words, digital media server 3 extracts request range specification information from the telegram for request of AV data (range specification) of arrow 57 of FIG. 5. Range information determining section 36 of digital media server 3 determines whether the request range specification information exceeds the range of the reproduction permitted range specification information (step S35). Here, the reproduction permitted range specification information corresponds to the playitem and clip number in content reproduction control information storage section 33. When the request range specification information is located within the permitted range (Yes in step S35), digital media server 3 progresses to step S36. Digital media server 3 executes an AV data transmitting processing step (step S36). In other words, digital media server 3 generates a telegram for transmission of partial AV data of arrow 58 of FIG. 5 having AV data within the range of the reproduction permitted range specification information, and transmits it. Then, digital media server 3 comes into a state of waiting for a request from digital media player 4.

When the request range specification information exceeds the range of the reproduction permitted range specification information (No in step S35), digital media server 3 executes an error message processing step (step S37). In other words, digital media server 3 does not execute the generation and transmission of the telegram for transmission of partial AV data of arrow 58 of FIG. 5, and generates and transmits an error message to digital media player 4. Then, digital media server 3 comes into a state of waiting for a request from digital media player 4.

The flowchart of the content reproduction method of FIG. 12 can be usually achieved by software, and the software is previously stored in a ROM and is executed on a common MPU or memory. Here, as the ROM, a nonvolatile recording medium such as a rewritable ROM is preferable, and a volatile recording medium can be also employed.

The flowchart of the content reproduction method of FIG. 13 can be usually achieved by software, and the software is previously stored in a ROM and is executed on a common MPU or memory. Here, as the ROM, a nonvolatile recording medium such as a rewritable ROM or a hard disk drive is preferable, and a volatile recording medium can be also employed.

One of the purposes of the content reproduction system and content reproduction method of the present invention is to further improve the content reproduction mode conforming to the DLNA. Therefore, the server and the content reproduction device have a communication step that is executed under a communication protocol conforming to the DLNA (Digital Living Network Alliance) standard. Therefore, the notation of each information and each telegram has been described using a form conforming to the DLNA, for example. Detailed description of the information and telegram related to the DLNA is omitted.

The content reproduction system and content reproduction method of the present invention can be applied to a digital media player and digital media server that do not conform to the DLNA.

The present invention is not limited to the above-mentioned embodiments, and the configuration of the embodiments, the contents and expression forms of the telegrams, and procedures of the flowcharts can be changed.

INDUSTRIAL APPLICABILITY

The content reproduction system, the content reproduction method, the content reproduction device of the present invention are useful as a system and method used when a user at home selects a desired content from one or more contents consisting of one or more AV data segments with the content reproduction device, makes a server deliver the content, and views the content with the content reproduction device.

REFERENCE MARKS IN THE DRAWINGS

2 network
3 digital media server
4 digital media player
4a reproduction device
4b controller
10 second transmitting/receiving section
10a third transmitting/receiving section
10b fourth transmitting/receiving section
11 content list information request generating section
12 content list information acquiring section
13 content specification information generating section
14 content reproduction control information acquiring section
15 clip information request generating section
16 clip information acquiring section
17 AV data request generating section
18 AV data acquiring section
19 user IF section
20 content reproduction control information analyzing section
21 AV data decoding section
30 first transmitting/receiving section
31 control section
32 directory storage section
33 content reproduction control information storage section
34 clip information storage section
35 AV data storage section
36 range information determining section
41 AV data
42 AV data
43 AV data
44 AV data

The invention claimed is:

1. A content reproduction system comprising:
a server including:
a processor;
a memory;
an AV data storage section, controlled by the processor, and configured to storing a plurality of AV data segments in the memory;
a clip information storage section, controlled by the processor, and configured to store a plurality of clip information in the memory, the plurality of clip information being management information of the plurality of AV data segments, wherein each of the plurality of clip information corresponds to one of the plurality of AV data segments and includes a time map table of the AV data segment;
a content reproduction control information storage section, controlled by the processor, and configure to store content reproduction control information in the memory including at least one playlist, wherein the at least one playlist identifies the plurality of AV data segments using the plurality of clip information to define a reproduction order of the plurality of AV data segments; and
a first transmitting/receiving section, controlled by the processor, and configured to at least transmit, to a network, the plurality of AV data segments, the plurality of clip information, the content reproduction control information including the at least one playlist, and a first location information for indicating a location of the content reproduction control information; and
a content reproduction device including:
a processor;
a memory;
a second transmitting/receiving section controlled by the processor, and configured to at least receive, from the network, the plurality of AV data segments, the plurality of clip information, the content reproduction control information including the at least one playlist, and the first location information for indicating the location of the content reproduction control information;
a content reproduction control information acquiring section configured to acquire, by the processor, the content reproduction control information from the first location information;
a content reproduction control information analyzing section configured to extract, by the processor, from the content reproduction control information, a clip number corresponding to the one of the plurality of AV data segments;

a clip information request generating section configured to generate, by the processor, a second location information that indicates a location of at least one of the plurality of clip information by replacing the clip number to a part of the first location information, and configured to request the server to acquire the clip information;

a clip information acquiring section configured to acquire, by the processor, the clip information from the location indicated by the second location information;

an AV data request generating section configured to generate, by the processor, a third location information that indicates a location of the one of the plurality of AV data segments by replacing the clip number to a part of the first location information and adding a reproducing range information of the AV data segment, the reproducing range information being generated by referring to the time map table of the clip information, and configured to request the server to acquire the one of the plurality of AV data segments identified by the clip number; and an AV data acquiring section configured to acquire, by the processor, the one of the plurality of AV data segments identified by the clip number from the location indicated by the third location information.

2. The content reproduction system of claim 1, wherein
the server further includes a range information determining section,
the AV data request generating section of the content reproduction device transmits, to the server, request range specification information for specifying a reproduction range of the plurality of AV data segments,
the range information determining section compares the request range specification information with reproduction permitted range specification information for specifying a reproduction permitted range of the plurality of AV data segments, and
when the request range specification information exceeds the reproduction permitted range of the reproduction permitted range specification information, the first transmitting/receiving section of the server transmits error information to the content reproduction device.

3. The content reproduction system of claim 1, wherein
the content reproduction device communicates with the server under a communication protocol conforming to a DLNA standard.

4. A server comprising:
a processor;
a memory;
an AV data storage section configured to store a plurality of AV data segments in the memory;
a clip information storage section configured to store a plurality of clip information in the memory, the plurality of clip information being management information of the plurality of AV data segments, wherein each of the plurality of clip information corresponds to one of the plurality of AV data segments and includes a time map table of the AV data segment;
a content reproduction control information storage section configured to store content reproduction control information in the memory including at least one playlist, wherein the at least one playlist identifies the plurality of AV data segments using the plurality of clip information to define a reproduction order of the plurality of AV data segments; and a first transmitting/receiving section controlled by the processor and configured to:
transmit, to a network, the plurality of AV data segments, the plurality of clip information, the content reproduction control information including the at least one playlist, and a first location information for indicating a location of the content reproduction control information,
receive 1) a second location information indicating a location of clip information, and 2) a third location information indicating a location of one of the plurality of AV data segments, and
wherein the second location information and the third location information are separate location information generated from the first location information based on the content reproduction control information, the second location information being generated from the first location information by replacing a clip number to a part of the first location information, the third location information being generated from the first location information by replacing the clip number to a part of the first location information and adding a reproducing range information of the AV data segment, the reproducing range information being generated by referring to the time map table of the clip information.

5. The server of claim 4, wherein
the content reproduction control information includes information for identifying the plurality of clip numbers and information for identifying a reproduction range of the plurality of AV data segments.

6. The server of claim 5, wherein
the first location information for indicating the location of the content reproduction control information is a URL for indicating the location of the content reproduction control information.

7. The server of claim 4 further comprising a range information determining section, wherein
the AV data request generating section of the content reproduction device transmits, to the server, request range specification information for specifying a reproduction range of the plurality of AV data segments,
the range information determining section compares the request range specification information with reproduction permitted range specification information for specifying a reproduction permitted range of the plurality of AV data segments, and
when the request range specification information exceeds the reproduction permitted range of the reproduction permitted range specification information, the first transmitting/receiving section of the server transmits error information to the content reproduction device.

8. The server of claim 4 communicating with the content reproduction device under a communication protocol conforming to a DLNA standard.

9. A content reproduction device comprising:
a processor;
a second transmitting/receiving section controlled by the processor and configured to at least receive, from a network, a plurality of AV data segments, a plurality of clip information, content reproduction control information including at least one playlist, and a first location information for indicating a location of the content reproduction control information;

a content reproduction control information acquiring section configured to acquire, by the processor, the content reproduction control information from the first location information;

a content reproduction control information analyzing section configured to extract, by the processor, from the content reproduction control information, a clip number corresponding to the one of the plurality of AV data segments;

a clip information request generating section configured to generate, by the processor, a second location information that indicates a location of at least one of the plurality of clip information, by replacing the clip number to a part of the first location information, and configured to request the server to acquire the clip information;

a clip information acquiring section configured to acquire, by the processor, the clip information identified by the clip number from the location indicated by the second location information;

an AV data request generating section configured to generate, by the processor, a third location information that indicates a location of the one of the plurality of AV data segments, by replacing the clip number to a part of the first location information and adding a reproducing range information of the AV data segment, the reproducing range information being generated by referring to the time map table of the clip information, and configured to request the server to acquire the one of the plurality of AV data segments identified by the clip number; and an AV data acquiring section configured to acquire, by the processor, the one of the plurality of AV data segments identified by the clip number from the location indicated by the third location information.

10. The content reproduction device of claim 9, wherein the content reproduction control information includes information for identifying the plurality of clip numbers and information for identifying a reproduction range of the plurality of AV data segments.

11. The content reproduction device of claim 10, wherein the first location information is a first URL,
the second location information is a second URL, and
the third location information is a third URL.

12. The content reproduction device of claim 9, wherein the clip information request generating section or the AV data request generating section of the content reproduction device transmits request range specification information for specifying a reproduction range of the plurality of AV data segments, and receives error information from the server when the request range specification information exceeds a reproduction permitted range of reproduction permitted range specification information.

13. The content reproduction device of claim 9 communicating with the server under a communication protocol conforming to a DLNA standard.

14. A content reproduction method comprising:
acquiring content reproduction control information based on a first location information for indicating a location of the content reproduction control information, the content reproduction control information including at least one playlist, wherein the at least one playlist identifies a plurality of AV data segments using a plurality of clip information which includes a time map table of the AV data segments, to define a reproduction order of the plurality of AV data segments;

extracting, from the content reproduction control information including the at least one playlist, one of the plurality of AV data segments and the clip number corresponding to the one of the plurality of AV data segments;

generating the a second location information that indicates a location of at least one of the plurality of clip information by replacing the clip number to a part of the first location information, and requesting the server to acquire the clip information identified by the clip number;

acquiring the clip information identified by the clip number from the location indicated by the second location information;

generating a third location information that indicates a location of the one of the plurality of AV data segments by replacing the clip number to a part of the first location information and adding a reproducing range information of the AV data segment, the reproducing range information being generated by referring to the time map table of the clip information, and requesting the server to acquire the one of the plurality of AV data segments identified by the clip number;

acquiring the one of the plurality of AV data segments identified by the clip number from the location indicated by the third location information;

determining whether reception of a plurality of partial AV data segments is completed when telegrams for transmission of the plurality of the partial AV data segments are repeatedly transmitted; and determining whether reception of all of the plurality of partial AV data segments is completed when the plurality of the partial AV data segments is received.

15. The content reproduction method of claim 14, wherein the content reproduction control information includes information for identifying the plurality of clip numbers and information for identifying a reproduction range of the plurality of AV data segments.

16. The content reproduction method of claim 15, wherein the first location information is a first URL,
the second location information is a second URL, and
the third location information is a third URL.

17. The content reproduction method of claim 14, further comprising:
a clip information responding processing step of receiving, from a content reproduction device, request range specification information for specifying a reproduction range of the plurality of AV data segments;

a range information determining processing step in which range information determining section compares the request range specification information with reproduction permitted range specification information for specifying a reproduction permitted range of the plurality of AV data segments, and determines whether the request range specification information exceeds the reproduction permitted range defined by the reproduction permitted range specification information; and an error message processing step of transmitting error information to the content reproduction device when the request range specification information exceeds the reproduction permitted range of the reproduction permitted range specification information.

18. The content reproduction method of claim 14 comprising a step in which a server communicates with a content reproduction device under a communication protocol conforming to a DLNA standard.

* * * * *